Jan. 3, 1933.  E. ROSENBERG  1,892,905
CONTROL MEANS FOR FARE INDICATORS
Filed June 27, 1931

INVENTOR
EDMUND ROSENBERG
BY Barnes & Kisselle
ATTORNEYS

Patented Jan. 3, 1933

1,892,905

UNITED STATES PATENT OFFICE

EDMUND ROSENBERG, OF BRUNN, CZECHOSLOVAKIA

CONTROL MEANS FOR FARE INDICATORS

Application filed June 27, 1931, Serial No. 547,438, and in Czechoslovakia and Germany May 30, 1930.

This invention relates to a method of and means for preventing the unchecked or fraudulent use of vehicles for hire which are equipped with devices for the automatic calculation and registration of the fares to be paid. Such vehicles can be misused by the omission on the part of the driver to switch in or otherwise render operative the mechanism (taximeter) for the registration of the fare, at the commencement of the paid journey, so that fewer kilometers are registered than have actually been covered by the driver under hire, to the detriment of the owner of the vehicle. The delayed coupling up of the registering mechanism can also lead to friction and unpleasantness, since the passenger is thereby deprived of the possibility of checking the fairness of the price asked.

The present invention has for its object to obviate these drawbacks. For this purpose the vehicle is provided with a device which is brought into action by the weight of the passenger on entering the vehicle, and which causes the fare registering device to be rendered operative, and that either directly or indirectly. In the simplest case, the movement of a resilient or yielding portion of the vehicle caused by the getting in of a passenger is directly transmitted to the fare registering device and utilized for the carrying out of the coupling or engaging action. The switching on of the taximeter can, however, also be effected through the intermediary of an auxiliary source of energy—for example a tensioned spring—and the movement initiated by the passenger then serves merely to bring this auxiliary source of energy into action. In each case an arrangement is provided to prevent the driver, when once the taximeter has been switched on in this manner, from rendering the same inoperative again during travel, and as long as the passenger remains in the vehicle.

The following description relates in particular to automobiles, but it will be clear that the invention can also be appropriately applied to other vehicles (motor-boats, and the like).

Examples of constructions for the carrying out of the invention are shown in the accompanying drawing, in which:—

Figure 1:
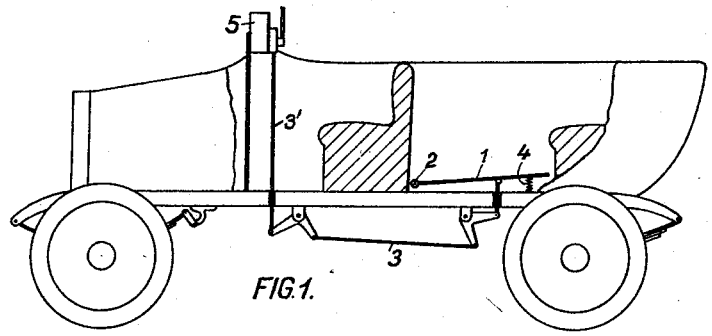
Fig. 1 shows diagrammatically the complete lay-out of one form of the device in which the engagement of the fare registering device is effected directly or through the intermediary of a mechanical auxiliary source of energy.
Figure 2:
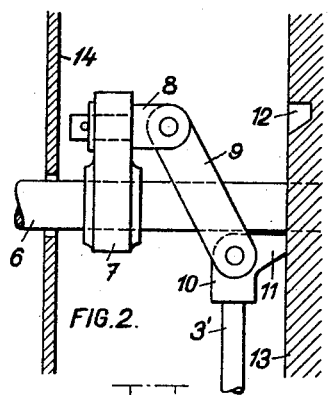
Figs. 2 and 3 show the device for the direct switching on of the fare registering device and for the locking of the same against unauthorized switching off, which is attached to the fare registering device, in two positions.

Referring to Fig. 1, 1 is a movable floor which is pivotally mounted at 2 and connected by means of the coupling rods 3 to the fare indicator 5. By means of the spring 4 the floor 1 is retained in the lifted position. The fare indicator 5 is provided with an arrangement of parts shown in Figs. 2 and 3. Its shaft 6 the rotation of which effects the switching on of the indicator is fitted with a lever 7 having a rotatable head 8 which is connected by means of the pair of straps or plates 9 to the end 10 of the rod 3'. This rod 3' is provided with a projection or pawl 11 which is adapted to fit into a recess 12 in the wall 13 of the fare indicator 5. A sealed casing 14 renders the device inaccessible to the driver who is merely able to turn the shaft 6 from the outside. Fig. 2 shows the relative position of the parts when the fare indicator is inoperative. When a passenger enters the vehicle, the floor 1 will be depressed against the action of the spring 4, and causes the rod 3' to be lifted. This rod rotates the lever 7 into the engaged position, the pawl 11 being caused to slide over the surface of the wall 13. When the engaging movement is completed the pawl 11 just reaches the recess 12 and drops into position in the same. The fare indicator is thus locked in the operative position, since the attempt to disengage the same by rotation of the shaft 6 is rendered ineffectual by the pawl 11 which bears with its oblique surface against the wall of the recess 12. When the passenger gets out, the rod 3' travels downwards, since the spring 4 raises the floor 1 again. The pawl 11 is thereby withdrawn from the recess 12, and the driver is enabled to switch off the fare indicator in the usual manner for the purpose of reading off the fare.

Figure 3:
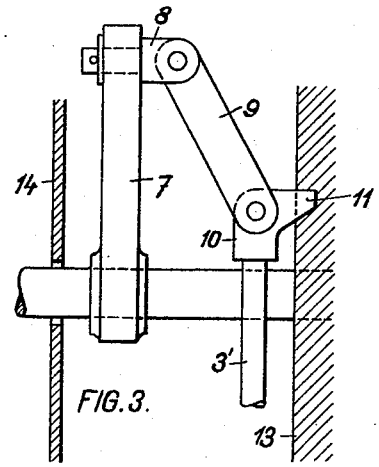
Figure 4:
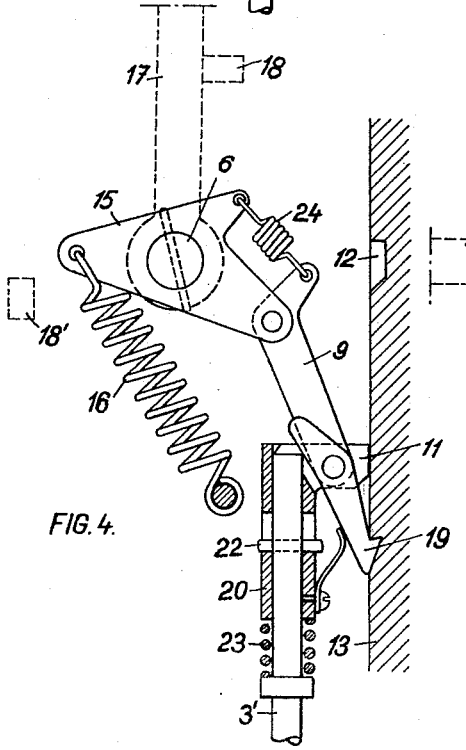
Figs. 4 and 5 represent a device for the switching on of the taximeter by means of an auxiliary spring, together with the locking device pertaining thereto, likewise in two positions.
Figure 5:
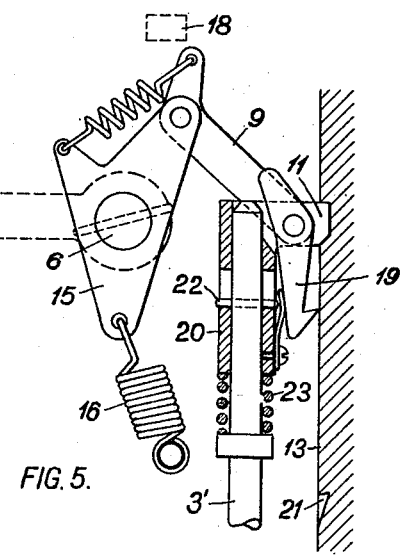

The modified form of construction shown in Figs. 4 and 5 differs from that of Figs. 2 and 3 in that the upward movement of the rod 3' releases a spring which in its turn switches on the fare indicator. To the shaft 6 there is attached a member 15 which is normally retained by the powerful spring 16 in the operative position of the indicator. On switching off the latter, the driver grasps the lever 17 and rotates the same up to the stop 18, whereby the spring 16 is put under tension (Fig. 4). At the same time the pawl 19, which is pivotally mounted on the sleeve 20, engages in the notch 21 in the wall and thus retains the spring 16 in the tensioned position. The end of the rod 3' is free to slide within the sleeve 20, as far as it is allowed to do so by the pin 22 and the spring 23. When a passenger enters the vehicle and the rod 3' is lifted, the spring 23 is first compressed, and the upper end of the rod rocks the pawl 19 out of the position of engagement. At this moment the spring 16 is liberated, and rotates the member 15 together with the shaft 6 into the operative or engaged position. At the termination of the engaging movement the nose 11 on the sleeve 20 drops into the recess 12 in the wall 13, and locks the fare indicator in the operative position, as shown in Figs. 2 and 3. When the rod 3' descends, the nose 11 comes out of engagement with the recess 12, and the driver is now enabled to effect the switching off of the fare indicator by rotation of the lever 17. By the action of the weak spring 24 the nose 11 is pressed through the intermediary of the pair of straps or plates 9 against the wall 13. This same spring also tends to press the pawl 19 against the wall 13, so that after the completion of the tensioning of the spring 16 this pawl snaps into the notch 21.

The invention is not to be regarded as limited to the constructional examples given; on the contrary, a large number of variations are possible in the actual constructional arrangement and details. Thus in place of the depression of the floor of the vehicle, the downward movement of the whole bodywork in relation to and against the action of the springs of the vehicle caused by the entry of the passenger may be utilized as the instigating movement for the switching on of the fare indicator. In this case the system of transmitting and coupling rods is preferably arranged to be adjustable, for the purpose of enabling the load at which the apparatus responds to be adjusted. Instead of or in addition to the floor the seats may also be arranged to be movable. Finally, the action of the weight of the passenger may be transmitted to the fare indicator by electric or hydraulic means.

I claim:—

1. In a vehicle having a fare indicator, the combination of a movable part adapted to be depressed by the weight of an entering passenger, a spring beneath the said part adapted to retain the said part normally in the raised position, a casing about the said fare indicator, a recess in the wall of the said casing, a rotatable switching shaft in the said fare indicator, an actuating rod within the said casing, a head piece on the said rod, a nose on the said head piece adapted to slide along the said wall and to engage in the said recess, a crank-lever attached to the said switching shaft, coupling means (9) between the outer end of the said crank-lever and the said head piece, and means for transmitting the movement of the said movable part to the said actuating rod.

2. In a vehicle having a fare indicator, the combination of a movable part adapted to be depressed by the weight of an entering passenger, a spring beneath the said part adapted to retain the said part normally in the raised position, a casing about the said fare indicator, a recess in the wall of the said casing, a notch in the wall of the said casing, a rotatable switching shaft in the said fare indicator, an actuating rod within the said casing, a sleeve about the said rod, means for limiting the movement of the said rod in relation to the said sleeve, a head piece on the said rod, a nose on the said head piece adapted to slide along the said wall and to engage in the said recess, a crank-lever attached to the said switching shaft, a spring adapted to draw the said crank-lever into the switching-on position, a pawl on the said head piece adapted to slide along the said wall, to engage in the said notch, and to retain the said crank-lever and switching shaft in the switching-off position, means for pressing the said pawl against the said wall, coupling means between the outer end of the said crank-lever and the said head piece, and means for transmitting the movement of the said movable part to the said actuating rod.

In testimony whereof I have signed my name to this specification.

EDMUND ROSENBERG.